United States Patent [19]

Lin et al.

[11] Patent Number: 5,678,036
[45] Date of Patent: Oct. 14, 1997

[54] GRAPHICS SYSTEM AND METHOD FOR MINIMIZING IDLE TIME OF A CONTROLLER OF THE GRAPHICS SYSTEM

[75] Inventors: Hung-Ming Lin; Lintien Mei; James Lee, all of Hsin-Chu, Taiwan

[73] Assignee: Silicon Integrated Systems Corp., Hsin-Chu, Taiwan

[21] Appl. No.: 452,022

[22] Filed: May 31, 1995

[51] Int. Cl.[6] .................................................. G06F 15/00
[52] U.S. Cl. ........................... 395/522; 395/503; 395/513
[58] Field of Search .................................. 395/164, 162, 395/165, 166, 200, 501, 503, 513, 521, 522

[56] References Cited

U.S. PATENT DOCUMENTS

| | | | |
|---|---|---|---|
| 5,511,165 | 4/1996 | Brady et al. | 395/200.01 |
| 5,522,028 | 5/1996 | Nagata et al. | 395/165 |

Primary Examiner—Kee M. Tung
Assistant Examiner—Cao Nguyen

[57] ABSTRACT

A method for minimizing idle time of a controller in a graphics system, which includes a graphics memory and a graphics accelerating device that interconnects the controller and the graphics memory, is disclosed. The graphics accelerating device includes a command register for storing command signals from the controller therein, and a graphics engine for receiving and executing the command signals stored in the command register one at a time. The method includes the steps of: detecting whether number of the command signals in the command register which are yet to be executed by the graphics engine has reached a predetermined threshold number; transferring the command signals, which are yet to be executed by the graphics engine, from the command register to a reserved space of the graphics memory when the predetermined threshold number is reached so as to permit the controller to store continuously the command signals in the command register in order to minimize idle time of the controller; and determining whether the reserved space of the graphics memory contains the command signals transferred from the command register, and providing the command signals in the reserved space of the graphics memory, instead of the command signals stored in the command register, one at a time to the graphics engine for execution by the graphics engine.

5 Claims, 5 Drawing Sheets

GRAPHICS SYSTEM AND METHOD FOR MINIMIZING IDLE TIME OF A CONTROLLER OF THE GRAPHICS SYSTEM

BACKGROUND OF THE INVENTION

1. Field of the Invention

This invention relates to a graphics system and to method for minimizing idle time of a controller of the graphics system.

2. Description of the Related Art

In view of the rapid growth of the multimedia market and recent developments in VLSI technology, graphics accelerating devices employed in graphics systems become more and more popular in personal computer applications. FIG. 1 is a schematic block diagram showing a conventional graphics system. The graphics system includes a controller 2, a graphics memory 3 and a graphics accelerating device 1 which interconnects the controller 2 and the graphics memory 3 via a system bus 4 and a memory bus 5. The graphics accelerating device 3 includes: a command register 10 for storing command signals, received from the controller 2 via the system bus 4, therein; a graphics engine 11 for receiving and executing the command signals stored in the command register 10 one at a time; and a memory controller 12 for accessing the graphics memory 3 via the memory bus 5 in accordance with the command signal which is being executed by the graphics engine 11. The command register 10 is an FIFO unit. Generally, the graphics memory 3 is a dynamic random access memory or a video random access memory.

Referring now to FIG. 2, supposing there are nine successive command signals (C1,E1,C2,E2,C3,E3,C4,E4,C5), wherein the command signals (E1,E2,E3,E4) are to be executed by the graphics engine while the command signals (C1,C2,C3,C4,C5) are to be executed by the controller. Referring to FIG. 3, if the command register is only capable of storing one command signal therein, after the command signal (C1) is executed by the controller, the command signal (E1) is stored in the command register and is executed immediately by the graphics engine. At the same time, the command signal (C2) is executed by the controller. After the command signal (C2) is executed, the command signal (E2) can be stored in the command register even though execution of the command signal (E1) has not yet been completed. At the same time, the command signal (C3) is executed by the controller. However, after the command signal (C3) is executed, since execution of the command signal (E1) has not yet been completed, and since the command signal (E2) in the command register is yet to be executed, the command signal (E3) thus cannot be stored in the command register. Therefore, the controller is idle for a time (H2) until the execution of the command signal (E1) has been completed and execution of the command signal (E2) is initiated by the graphics engine. Idling of the controller for a time (H3) also occurs after executing the command signal (C4) since the command signal (E4) can be stored in the command register only after the graphics engine has started executing the command signal (E3).

Referring now to FIG. 4, if the command register can store two command signals therein, the command signal (E3) can be stored in the command register although the command signal (E1) has not yet been completed. Therefore, the command signal (C4) can be executed by the controller without the occurrence of the idle time (H2) shown in FIG. 3. However, if the command signal (E1) has not yet been completed, idling of the controller for a time (H4) can still occur after executing the command signal (C4) since the command signals (E3,E4) in the command register are yet to be executed by the graphics engine. Idling ends only after the graphics engine has started executing the command signal (E2).

From the foregoing, it is obvious that the larger the number of command signals that can be stored in the command register, the smaller will be the probability of the occurrence of idle time in the controller. However, increasing the total capacity of the command register will complicate and enlarge the circuitry of the graphics accelerating device of the graphics system, thereby increasing the manufacturing cost.

SUMMARY OF THE INVENTION

Therefore, the main objective of the present invention is to provide a graphics system and method for minimizing idle time of a controller in the graphics system, which graphics system has a simple structure and a relatively low manufacturing cost.

According to one aspect of the present invention, a method for minimizing idle time of a controller in a graphics system, which includes a graphics memory and a graphics accelerating device that interconnects the controller and the graphics memory, is disclosed. The graphics accelerating device includes a command register for storing command signals from the controller therein, and a graphics engine for receiving and executing the command signals stored in the command register one at a time. The method includes the steps of: detecting whether number of the command signals in the command register which are yet to be executed by the graphics engine has reached a predetermined threshold number; transferring the command signals, which are yet to be executed by the graphics engine, from the command register to a reserved space of the graphics memory when the predetermined threshold number is reached so as to permit the controller to store continuously the command signals in the command register in order to minimize idle time of the controller; and determining whether the reserved space of the graphics memory contains the command signals transferred from the command register, and providing the command signals in the reserved space of the graphics memory, instead of the command signals stored in the command register, one at a tame to the graphics engine for execution by the graphics engine.

According to another aspect of the present invention, a graphics system includes a controller, a graphics memory and a graphics accelerating device which interconnects the controller and the graphics memory. The graphics accelerating device includes a command register for storing command signals from the controller therein, and a graphics engine for receiving and executing the command signals stored in the command register one at a time. A detecting means detects whether number of the command signals in the command register which are yet to be executed by the graphics engine has reached a predetermined threshold number. A transferring means is activated by the detecting means and transfers the command signals, which are yet to be executed by the graphics engine, from the command register to a reserved space of the graphics memory when the predetermined threshold number is reached so as to permit the controller to store continuously the command signals in the command register in order to minimize idle time of the controller. A determining means determines whether the reserved space of the graphics memory contains the command signals transferred from the command register and provides the command signals in the reserved space of the graphics memory, instead of the command signals stored in the command register, one at a time to the graphics engine for execution by the graphics engine.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
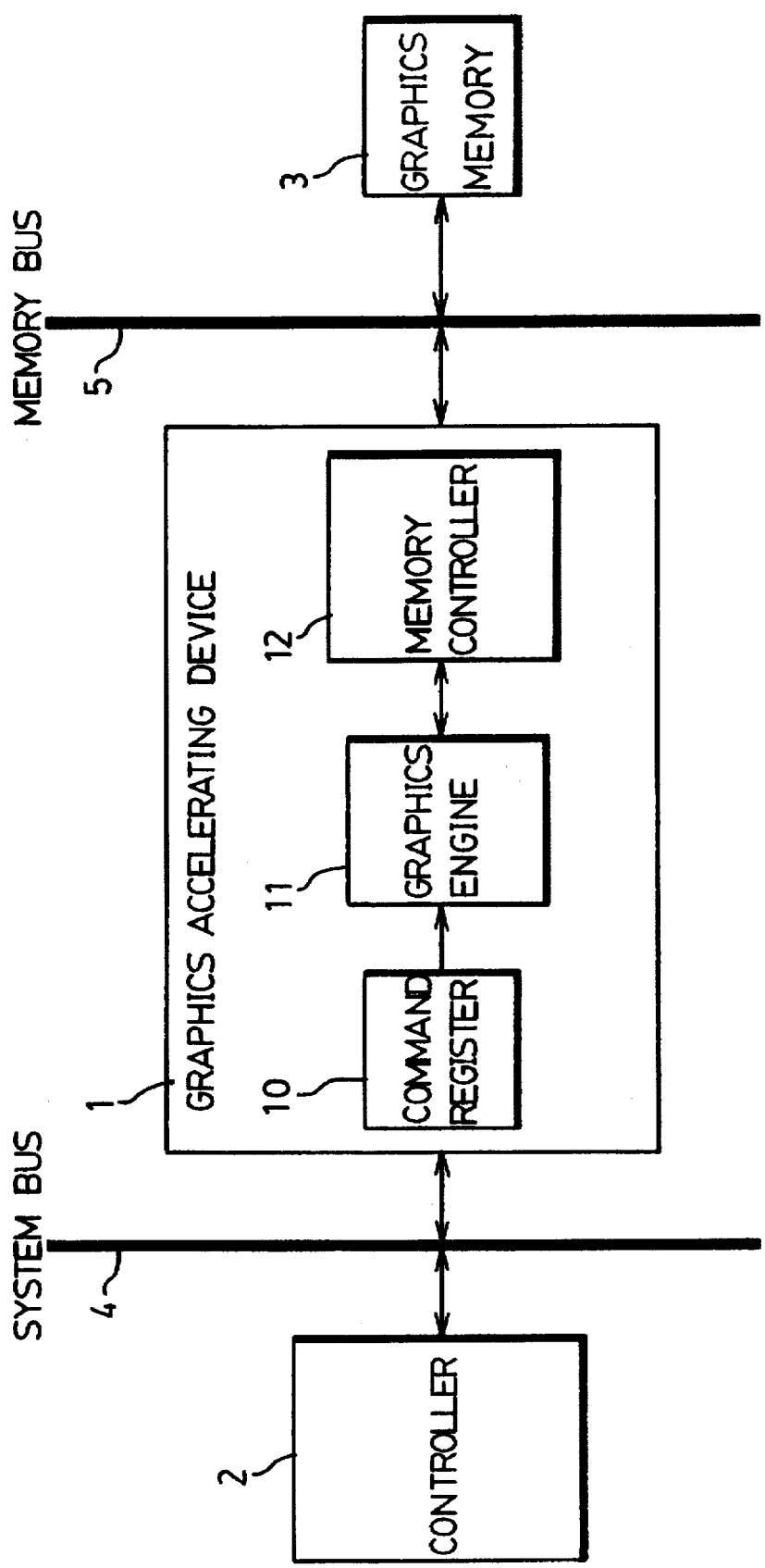
FIG. 1 is a schematic block diagram of a conventional graphics system.
Figure 2:
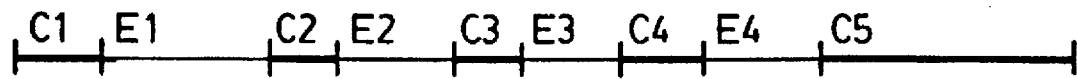
FIG. 2 is a timing diagram showing a plurality of successive command signals to be executed by the conventional graphics system of FIG. 1.
Figure 3:
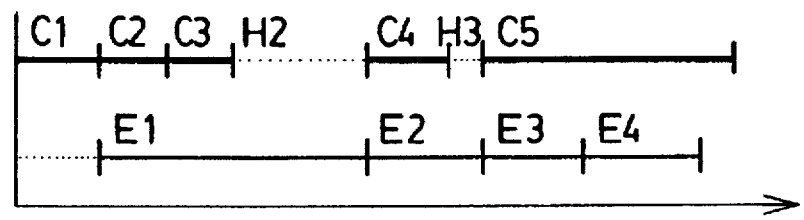
FIG. 3 is a timing diagram showing when idling of a controller of the conventional graphics system in FIG. 1 occurs if the command signals of FIG. 2 are executed.
Figure 4:
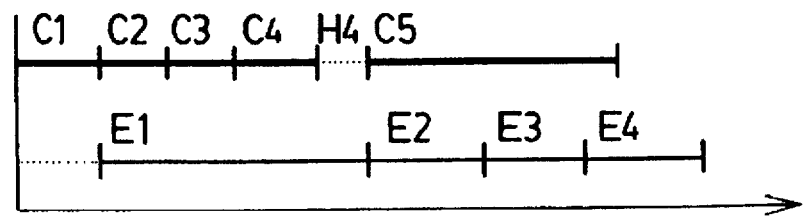
FIG. 4 is another timing diagram showing when idling of the controller of the conventional graphics system in FIG. 1 occurs if the command signals of FIG. 2 are executed, the capacity of a command register of a graphics accelerating device of the conventional graphics system being larger than that of a command register of the graphics accelerating device employed to obtain the timing diagram of FIG. 3.
Figure 5:
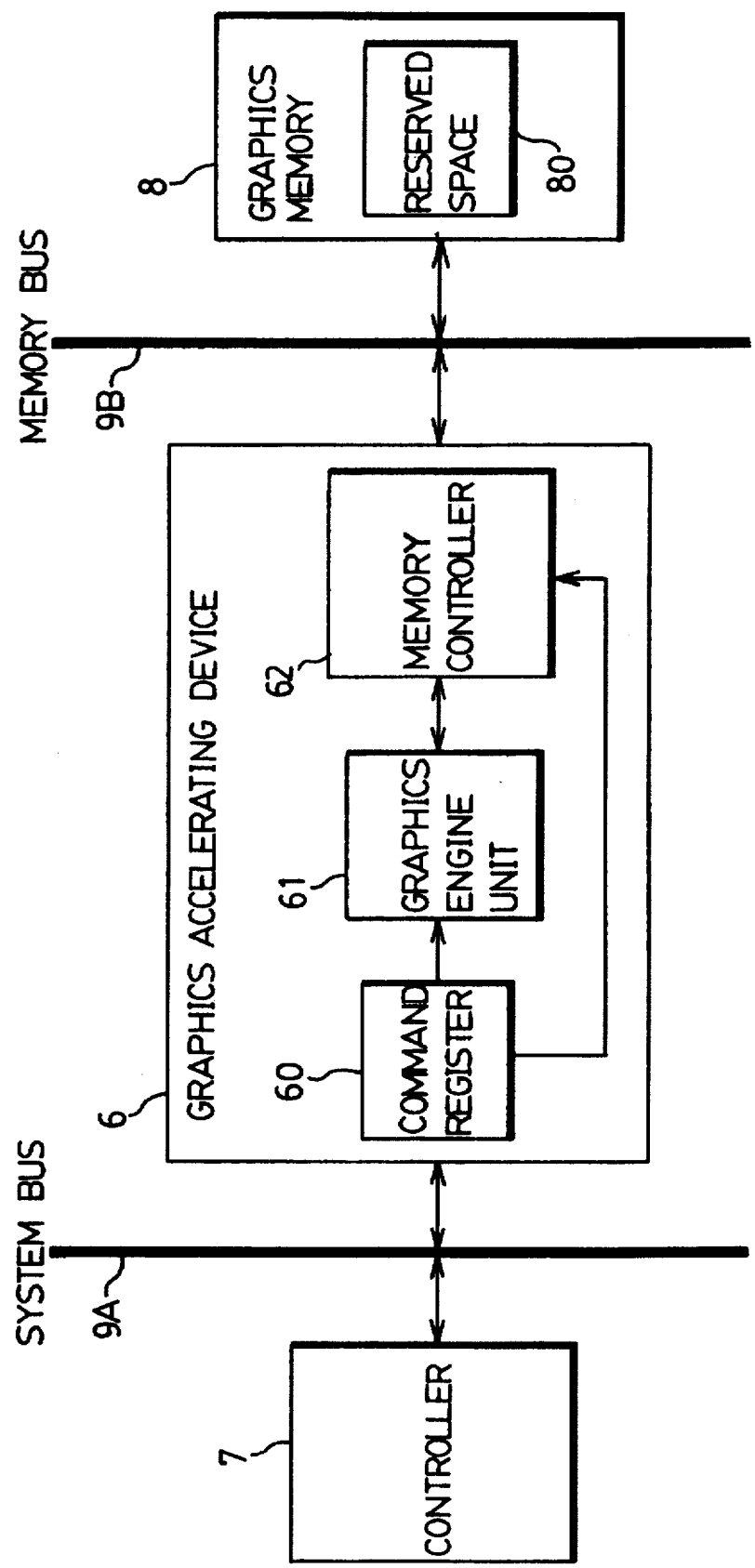
FIG. 5 is a schematic block diagram of a graphics system according to the present invention.
Figure 6:
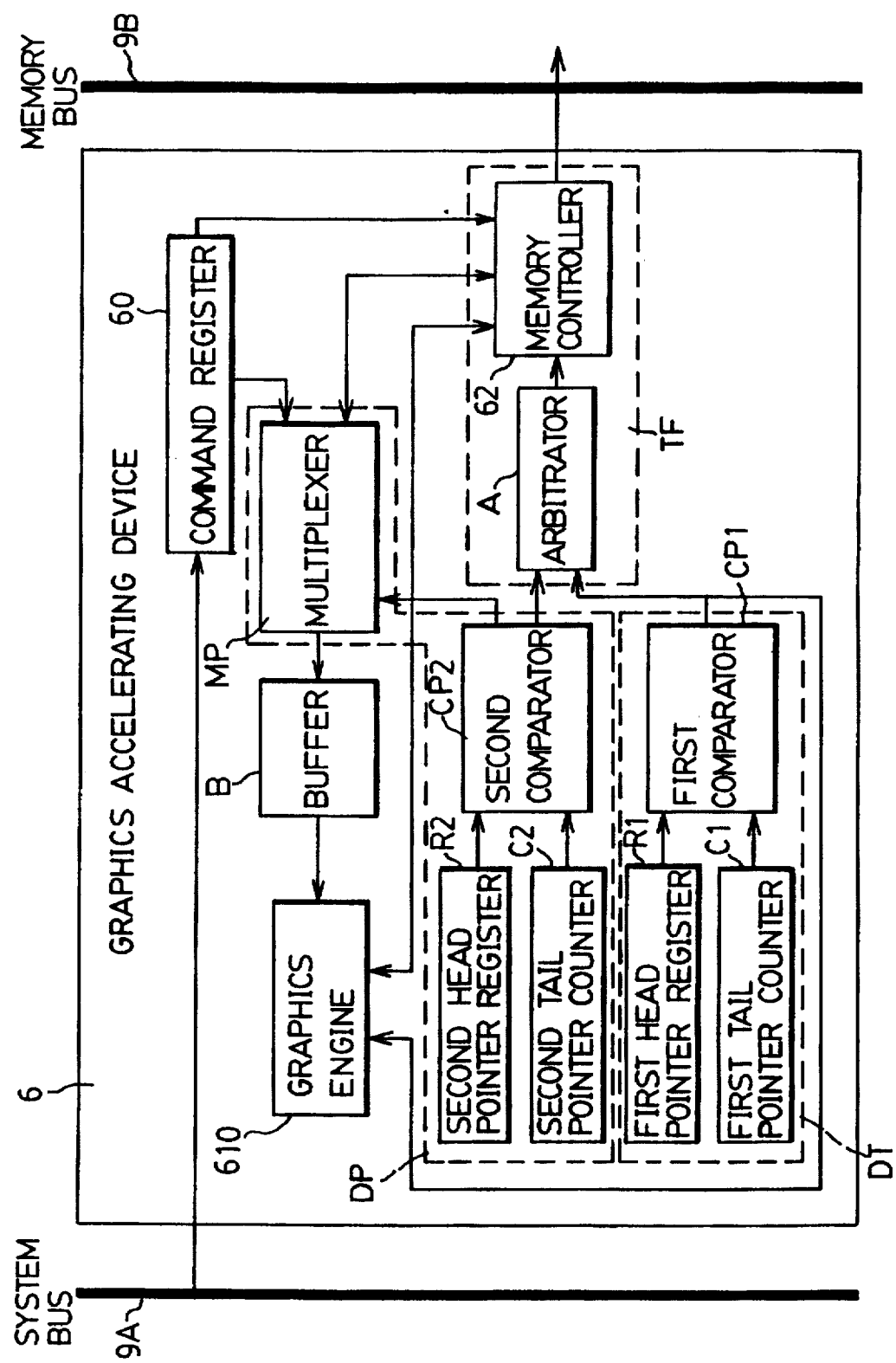
FIG. 6 is a schematic block diagram of a graphics accelerating device of the graphics system according to the present invention.

Referring to FIGS. 5 and 6, a graphics system according to the present invention includes a controller 7, a graphics memory 8, and a graphics accelerating device 6 which interconnects the controller 7 and the graphics memory 8 via a system bus (9A) and a memory bus (9B). The controller 7 and the graphics memory 8 are known in the art and will not be detailed herein.

In the present embodiment, the graphics memory 8 has a reserved space 80 which has a total capacity greater than that of the command register 60 and which is constructed by a function call provided by a driver (not shown). The reserved space 80 may be located at an off-screen memory (not shown), and the total capacity thereof may be set by the driver.

The graphics accelerating device 6 includes a command register 60 for storing command signals from the controller 7 therein via the system bus (9A), a graphics engine unit 61, and a memory controller 62. In the present embodiment, the command register 60 and the reserved space 80 of the graphics memory 8 have a ring-queue data structure.

Figure 7:
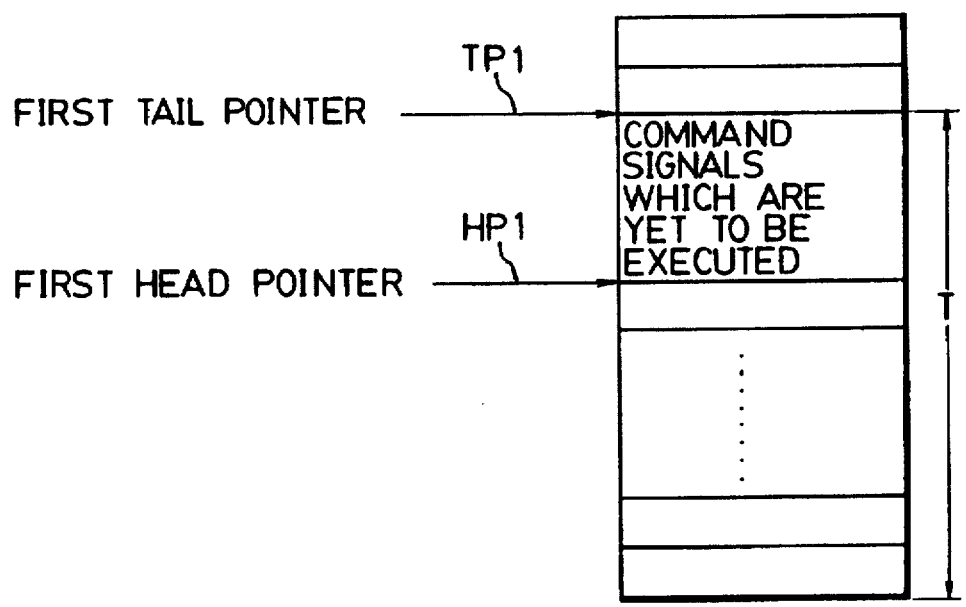
FIG. 7 is a schematic view showing the relationship among a command register, a first head pointer and a first tail pointer of the graphics system according to the present invention.

The graphics engine unit 61 includes a graphics engine 610 which is connected electrically to the memory controller 62 and which enables the graphics engine unit 61 to perform graphics accelerating functions, such as block transfer, line drawing, area fill, hardware cursor, and the like. A detecting means (DT) is used to detect whether number of the command signals in the command register 60 which are yet to be executed by the graphics engine 610 has reached a predetermined threshold number (T) (see FIG. 7) that is usually smaller than the total capacity of the command register 60 and that is set by the function call provided by the driver. The detecting means (DT) includes a first head pointer register (R1) for storing a first head pointer value therein, a first tail pointer counter (C1) for storing a first tail pointer value therein, and a first comparator (CP1) for comparing the first head and tail pointer values. The first head pointer value corresponds to location of a last one of the command signals received from the controller 7 in the command register 60. In the present embodiment, the location of the last one of the command signals received from the controller 7 in the command register 60 is indicated by a first head pointer (HP1) (see FIG. 7). The first tail pointer value corresponds to location of a first one of the command signals in the command register 60 which is yet to be executed by the graphics engine 610. In the present embodiment, the location of the first one of the command signals in the command register 60 which is yet to be executed by the graphics engine 610 is indicated by a first tail pointer (TP1) (see FIG. 7). The difference between the first head and tail pointer values is equal to the number of command signals which are yet to be executed.

A transferring means (TF) is used to transfer the command signals, which are yet to be executed by the graphics engine 610, from the command register 60 to the reserved space 80 of the graphics memory 8 when the predetermined threshold number (T) is reached. The transferring means (TF) includes an arbitrator (A) which is connected electrically to the first comparator (CP1) and to the memory controller 62 and which is activated by the first comparator (CP1) when difference between the first head and tail pointer values is equal to the predetermined threshold number (T). The memory controller 62 is further connected electrically to the command register 60 and the graphics memory 8. The memory controller 62 is controlled by the arbitrator (A) to transfer the command signals, which are yet to be executed by the graphics engine 610, from the command register 60 to the reserved space 80 of the graphics memory 8 when the arbitrator (A) is activated by the first comparator (CP1).

Figure 8:
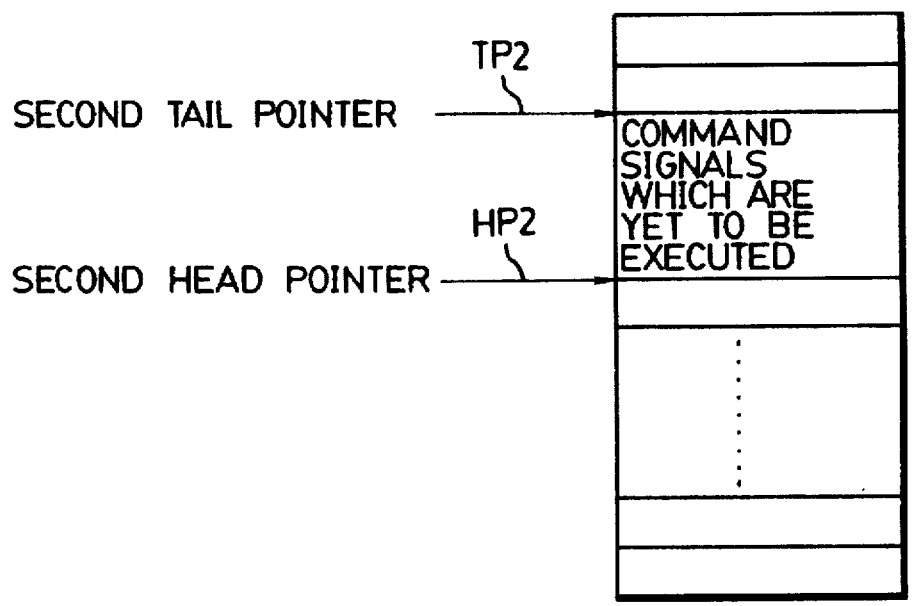
FIG. 8 is a schematic view showing the relationship among a reserved space of a graphics memory, a second head pointer and a second tail pointer of the graphics system according to the present invention.

A determining means (DP) is used to determine whether the reserved space 80 of the graphics memory 8 contains the command signals transferred from the command register 60 and to provide the command signals in the reserved space 80 of the graphics memory 8, instead of the command signals stored in the command register 60, one at a time to the graphics engine 610 for execution by the graphics engine 610. The determining means (DP) includes a second head pointer register (R2) for storing a second head pointer value therein, a second tail pointer counter (C2) for storing a second tail pointer value therein, and a second comparator (CP2) for comparing the second head and tail pointer values. The second head pointer value corresponds to location of a last one of the command signals stored in the reserved space 80 of the graphics memory 8 by the memory controller 62. In the present embodiment, the location of the last one of the command signals stored in the reserved space 80 of the graphics memory 8 by the memory controller 62 is indicated by a second head pointer (HP2) (see FIG. 8). The second tail pointer value corresponds to location of a first one of the command signals in the reserved space 80 of the graphics memory 8 which is yet to be executed by the graphics engine

610. In the present embodiment, the location of the first one of the command signals in the reserved space 80 of the graphics memory 8 which is yet to be executed by the graphics engine 610 is indicated by a second tail pointer (HP2) (see FIG. 8). The second comparator (CP2) activates the arbitrator (A) to control the memory controller 62 to retrieve the first one of the command signals in the reserved space 80 of the graphics memory 8 which is yet to be executed by the graphics engine 610 when the second head and tail pointer values are unequal.

The determining means (DP) further includes a multiplexer (MP) having data inputs connected to the command register 60 and the memory controller 62, a select input connected to the second comparator (CP3), and a data output connected to the graphics engine 610 via a buffer (B) for temporarily storing the command signal to be executed by the graphics engine 610.

Referring to FIGS. 5 to 8, in operation, the first head and tail pointer values are set to be the same, the second head and tail pointer values are set to be the same, and the total capacity of the reserved space 80 of the graphics memory 8, the starting address of the reserved space 80 of the graphics memory 8, and the predetermined threshold number (T) are set. Then, the command register 60 waits for the storage of command signals from the controller 7 therein, and the graphics engine 610 waits for a command signal to be executed thereby. It should be noted that, if one command signal from the controller 7 is stored in the command register 60, the first head pointer value is increased by one. If one command signal in the command register 60 is executed by the graphics engine 610, the first tail pointer value is increased by one. When the second head and tail pointer values are equal, and when the first head and tail pointer values are unequal, and when the first tail pointer value is unequal to the sum of the first head pointer value and one, and the first head pointer value is unequal to the sum of the first tail pointer value and the predetermined threshold number (T), the first comparator (CP1) activates the arbitrator (A) to control the multiplexer (MP) to connect the command register 60 to the graphics engine 610 via the buffer (B) such that the graphics engine 610 receives and executes the command signal from the command register 60. When the first head pointer value is equal to the sum of the first tail pointer value and the predetermined threshold number (T), the first comparator (CP1) activates the arbitrator (A) to control the memory controller 62 to transfer the command signals, which are yet to be executed by the graphics engine 610, from the command register 60 to the reserved space 80 of the graphics memory 8. At this time, the second head pointer value and the first tail pointer value are increased respectively by the predetermined threshold number (T), and the second comparator (CP2) activates the arbitrator (A) to control the multiplexer (MP) to connect the memory controller 62 to the graphics engine 610 via the buffer (B) so as to enable the graphics engine 610 to receive the first one of the command signals in the reserved space 80 of the graphics memory 8, which is yet to be executed thereby, instead of the command signals stored in the command register 60. At this stage, further command signals from the controller 7 can be stored in the command register 60, and will be transferred to the reserved space 80 of the graphics memory 8 when the first head pointer value is once more equal to the sum of the first tail pointer value and the predetermined threshold number (T). Therefore, the controller 7 is permitted to store continuously the command signals in the command register 60 in order to minimize idle time of the controller 7 since the reserved space 80 of the graphics memory 8 is large enough to store the command signals transferred from the command register 60 therein.

It should be noted that, when the first tail pointer value is equal to the sum of the first head pointer value and one, the first comparator (CP1) also activates the arbitrator (A) to control the memory controller 62 to transfer the command signals, which are yet to be executed by the graphics engine 610, from the command register 60 to the reserved space 80 of the graphics memory 8. However, the probability that the first tail pointer value will be equal to the sum of the first head pointer value and one is virtually nil by virtue of the provision of an appropriated predetermined threshold number (T).

It should be appreciated that the arbitrator (A) functions to determine whether the memory controller 62 is under the control of a controller read/write cycle, a crt cycle, or a command read/write cycle.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

We claim:

1. A graphics system including a controller, a graphics memory and a graphics accelerating device which interconnects said controller and said graphics memory, said graphics accelerating device including a command register for storing command signals from said controller therein, and a graphics engine for receiving and executing said command signals stored in said command register one at a time, said graphics accelerating device further comprising:

detecting means for detecting whether a number representative of said command signals in said command register which are yet to be executed by said graphics engine has reached a predetermined threshold number, wherein said detecting means includes:

a first head pointer register for storing a first head pointer value therein, said first head pointer value corresponding to a location of a last one of said command signals received from said controller in said command register;

a first tail pointer counter for storing a first tail pointer value therein, said first tail pointer value corresponding to a location of a first one of said command signals in said command register which is yet to be executed by said graphics engine; and a first comparator for comparing said first head pointer value and said first tail pointer value;

transferring means, activated by said detecting means, for transferring said command signals, which are yet to be executed by said graphics engine, from said command register to a reserved space of said graphics memory when the predetermined threshold number is reached so as to permit said controller to store continuously said command signals in said command register in order to minimize idle time of said controller; and determining means for determining whether the reserved space of said graphics memory contains said command signals transferred from said command register, and for providing said command signals in the reserved space of said graphics memory, instead of said command signals stored in said command register, one at a time to said graphics engine for execution by said graphics engine;

wherein said first comparator activates said transferring means when a difference between said first head pointer value and said first tail pointer value is equal to the predetermined threshold number.

2. The graphics system as claimed in claim 1, wherein said transferring means comprises an arbitrator connected electrically to said first comparator, and a memory controller connected electrically to said arbitrator, said command register and to said graphics memory, said memory controller being controlled by said arbitrator to transfer said command signals, which are yet to be executed by said graphics engine, from said command register to the reserved space of said graphics memory when said arbitrator is activated by said first comparator.

3. The graphics system as claimed in claim 2, wherein said determining means comprises:

a second head pointer register for storing a second head pointer value therein, said second head pointer value corresponding to location of a last one of said command signals stored in the reserved space of said graphics memory by said memory controller;

a second tail pointer counter for storing a second tail pointer value therein, said second tail pointer value corresponding to location of a first one of said command signals in the reserved space of said graphics memory which is yet to be executed by said graphics engine; and a second comparator for comparing said second head and tail pointer values, said second comparator activating said arbitrator to control said memory controller to retrieve the first one of said command signals in the reserved space of said graphics memory which is yet to be executed by said graphics engine when said second head and tail pointer values are unequal.

4. The graphics system as claimed in claim 3, wherein said determining means further comprises a multiplexer having data inputs connected to said command register and said memory controller, a select input connected to said second comparator, and a data output connected to said graphics engine, said second comparator controlling said multiplexer to connect said command register to said graphics engine when said second head and tail pointers are equal and to connect said memory controller to said graphics engine to enable said graphics engine to receive the first one of said command signals in the reserved space of said graphics memory which is yet to be executed thereby when said second head and tail pointer values are unequal.

5. The graphics system as claimed in claim 4, further comprising a buffer which interconnects said graphics engine and said data output of said multiplexer for temporarily storing the command signal to be executed by said graphics engine.

* * * * *